United States Patent [19]

Berendt

[11] Patent Number: 5,002,587
[45] Date of Patent: Mar. 26, 1991

[54] COPOLYMERS WHICH ARE WATER-SOLUBLE OR DISPERSIBLE IN WATER, THEIR PREPARATION AND USE

[75] Inventor: Hans-Ulrich Berendt, Langgartenweg, Switzerland

[73] Assignee: Ciba-Geigy Corporation, Ardsley, N.Y.

[21] Appl. No.: 414,995

[22] Filed: Sep. 29, 1989

[30] Foreign Application Priority Data

Oct. 3, 1988 [CH] Switzerland ............... 3665/88
Jul. 6, 1989 [CH] Switzerland ............... 2508/89

[51] Int. Cl.$^5$ ............... D06P 3/66; D06P 3/62; C09P 62/00; C09P 67/26
[52] U.S. Cl. ............... 8/543; 8/532; 8/552; 8/555; 8/558; 8/918
[58] Field of Search ............... 8/543, 918, 532, 558, 8/918, 552, 555

[56] References Cited

U.S. PATENT DOCUMENTS

| 3,284,429 | 11/1966 | Fuchs | 528/492 |
|---|---|---|---|
| 3,627,839 | 12/1971 | Vandenberg | 260/874 |
| 3,763,277 | 10/1973 | Chu et al. | 260/874 |
| 3,776,983 | 12/1973 | Iovine et al. | 260/901 |
| 4,060,650 | 11/1977 | Ohya et al. | 8/558 |
| 4,304,567 | 12/1981 | Ballmann et al. | 8/918 |
| 4,494,956 | 1/1985 | Schäfer et al. | 8/543 |
| 4,563,499 | 1/1986 | Frektzel et al. | 525/404 |
| 4,602,055 | 7/1986 | Schäfer | 524/157 |
| 4,731,092 | 3/1988 | Berandt | 8/477 |

FOREIGN PATENT DOCUMENTS 1220135 9/1966 Fed. Rep. of Germany .
1277220 1/1990 France .

*Primary Examiner*—A. Lionel Clingman
*Assistant Examiner*—J. E. Darland
*Attorney, Agent, or Firm*—George R. Dohmann; Edward McC. Roberts

[57] ABSTRACT

Copolymers which are obtainable from
(1) 20 to 50% by weight of an N-substituted or N-unsubstituted acrylamide or methacrylamide and
(2) 50 to 80% by weight of an N-vinyl-substituted amide or of a vinyl ester, derived in each case from a saturated aliphatic monocarboxylic acid,
the sum of (1) and (2) adding up to 100%.

These novel copolymers are suitable as dyeing assistants, particularly as padding assistants or liquor binders in the dyeing of cellulose fibre materials.

13 Claims, No Drawings

COPOLYMERS WHICH ARE WATER-SOLUBLE OR DISPERSIBLE IN WATER, THEIR PREPARATION AND USE

The present patent application relates to novel copolymers which are water-soluble or dispersible in water, processes for their preparation and their multifarious use, for example as dyeing assistants such as padding assistants or liquor binders, or as textile assistants for example in foam printing processes.

The novel copolymers are those which are obtainable from
(1) 20 to 50% by weight of an N-substituted or N-unsubstituted acrylamide or methacrylamide and
(2) 50 to 80% by weight of an N-vinyl-substituted amide or of a vinyl ester, derived in each case from a saturated aliphatic monocarboxylic acid,
where the sums of (1) and (2) add up to 100%.

Examples of monomers (1) used according to the invention are acrylamide or methacrylamide, which may for example in each case be N-substituted by $C_1$-$C_5$alkyl radicals, $C_2$-$C_4$hydroxyalkyl groups, $C_2$-$C_4$alkoxyalkyl groups, Di-($C_1$-$C_4$alkylamino)-$C_1$-$C_5$alkyl groups or by acetyl or acetyl-$C_1$-$C_5$alkyl or by —$CH_2CONH_2$ or

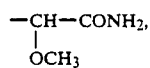

for example N-methylacrylamide, N,N-dimethylacrylamide, N-methoxymethylacrylamide, N-β-hydroxyethylacrylamide, N-diacetoneacrylamide, N-acetylacrylamide, N-acryloylamidoacetamide (acryloylglycine) or N-acryloylamidomethoxyacetamide and also N,N-di-β-hydroxyethylacrylamide, Mannich bases of acrylamide and methacrylamide, for example N-di($C_1$-$C_4$alkylamino)methyl-acrylamides and other N-alkyl-substituted acrylamides or methacrylamides, which bear a tertiary amino group on the alkyl radical, for example dimethylaminopropylacrylamide, diethylaminopropylacrylamide, dimethylaminopropylmethacrylamide, dimethylamino-2,2-dimethylpropylacrylamide or dimethylamino-2,2-dimethylpropylmethacrylamide. Mixtures of the acrylamide monomers (1) may also be used. Methacrylamide or particularly acrylamide are particularly preferred acrylamide monomers (1).

The vinyl compounds (2) which are to be concomitantly used according to the invention include particularly N-vinyl-substituted amides of aliphatic saturated monocarboxylic acids having 1 to 4 carbon atoms, for example N-vinylformamide, N-vinyl-N-methylformamide, N-vinylacetamide, N-methyl-N-vinylacetamide, and N-ethyl-N-vinylacetamide. Vinyl compounds (2) are furthermore to be understood as meaning vinyl esters of aliphatic saturated monocarboxylic acids having 1 to 4 carbon atoms, for example vinyl acetate, vinyl propionate or vinyl butyrate.

The monomer mixture comprises in particular 25 to 48% by weight of the acrylamide compound (1) and 52 to 75% by weight of the vinyl compound (2). The sum of the components (1) and (2) amounts to 100%.

Among these products, those which are preferred contain 35 to 48% by weight of acrylamide and 52 to 65% by weight of N-methyl-N-vinylacetamide, the sum of the reacted components being 100%. The percentages given relate to the total copolymer.

The preparation of the copolymers used according to the invention is carried out by methods known per se, advantageously in such a way that the monomer mixture of (1) and (2) is polymerized in the presence of initiators, advantageously at a temperature of 40° to 100° C.

Free-radical forming organic or inorganic compounds are advantageously used as initiators. Suitable organic initiators for carrying out the free-radical polymerisation are for example azoamides, for example azo-bis-2-methyl-(1,1-dimethyl-2-hydroxyethyl)propionamide, 2,2'-azo-bis (2-methyl-propiohydroxyamic acid), 2,2'-azo-bis-2-[N-phenylamidino]-propane dihydrochloride, 2,2'-azo-bis-2-methylpropionyl hydrazide, 2,2'-azo-bis-N,N-dimethyleneisobutylamidine or particularly 2,2'-azo-bis (2-amidinopropane) dihydrochloride. Suitable inorganic initiators are hydrogen peroxide, perborates, percarbonates, for example sodium percarbonate, persulfates, peroxydisulfates, for example potassium peroxydisulfate as well as redox systems known from the relevant literature.

These catalysts can be used in amounts of 0.05 to 2% by weight, advantageously 0.05 to 1% by weight and preferably 0.1 to 0.5% by weight, relative to the starting materials.

The copolymerisation is advantageously carried out in an inert atmosphere, for example in the presence of nitrogen.

The copolymers occur as very viscous materials. By dissolving and diluting with water gel-like products with a dry solids content of for example 0.1 to 20% by weight, preferably 2 to 10% by weight can be prepared. In order to preserve and/or improve the shelf life of the aqueous copolymer solutions obtained, preservatives can be added, for example chloroacetamide, N-hydroxymethylchloroacetamide, pentachlorophenolates, alkali metal nitrites, triethanolamine or hydroquinone monomethyl ether or also antibacterial agents, for example sodium azide or surface-active quaternary ammonium compounds, which have one or two fatty alkyl radicals. Mixtures of these preservatives and germicidal compounds may also be advantageously used.

The particularly preferred 2-10% by weight solutions of the copolymers obtained do not have ideal viscous flow characteristics but pseudoplastic flow characteristics. At 20° C., according to the shear rate, they have a dynamic viscosity between 100 and 100,000, preferably 1,000 to 50,000 and particularly 1,000 to 20,000 mPa.s (milli Pascal second).

The novel copolymers are used in particular as dyeing assistants in continuous or semicontinuous dyeing (or printing) of cellulose-containing textile material.

Accordingly, the invention also provides a process for dyeing textile materials which consist wholly or partially of cellulose fibres, with direct dyes or preferably with reactive dyes, which process comprises impregnating the textile materials with an aqueous liquor which contains copolymers according to the invention in addition to the dyes, and then fixing the dyes by the action of heat or by the cold pad-batch process.

The amounts in which the copolymers are added to the dyeing liquors may vary within wide limits. Thus, advantageous amounts are those from 2 to 40 g, preferably 5 to 20 g in the form of 3 to 10% aqueous solutions per liter of dyeing liquor.

The copolymers according to the invention are particularly suitable for the continuous or semicontinuous dyeing of textiles which consist of cellulose or contain cellulose, with direct dyes or preferably reactive dyes, it being possible to subject the cellulose materials to a heat treatment process after impregnation in order to fix the applied dyes. The fixation of the dyes is preferably carried out by the cold pad-batch process.

Suitable cellulose fibre material regenerated or in particular natural cellulose, for example staple viscose, filament viscose, hemp, linen, jute or preferably cotton, as well as fibre mixtures for example those of polyamide/cotton, or in particular of polyester/cotton, it being possible to dye the polyester component with disperse dyes beforehand, simultaneously or subsequently.

The textile material may be used in any form, for example yarns, hanks, woven fabrics, knitted fabrics, felts, preferably in the form of textile sheet-like structures, such as woven fabrics, knitwear or carpet, which consist wholly or partially of native, regenerated or modified cellulose. Both pretreated material and material in the grey or brown state may be used.

The customary direct dyes are suitable as direct dyes, for example the "Direct Dyes" mentioned in the Colour Index, 3rd edition (1971) volume 2 on pages 2005-2478.

Reactive dyes are to be understood as meaning the customary dyes which enter into a chemical bond with the cellulose, for example the "Reactive Dyes" listed in Colour Index, in volume 3 (3rd edition, 1971) on pages 3391-3560 and in volume 6 (revised 3rd edition, 1975) on pages 6268-6345. Vat dyes may also be used.

As a rule, the amount of dyes is governed by the desired depth of shade and is advantageously 0.1 to 80 g per liter of liquor, preferably 2 to 50 g/l of liquor.

As a rule, when reactive dyes are used, the preparations contain fixing alkalis.

Compounds reacting as alkalis for the fixation of reactive dyes are for example sodium carbonate, sodium bicarbonate, sodium hydroxide, disodium phosphate, trisodium phosphate, borax, aqueous ammonia or alkali donors, for example sodium trichloroacetate. In particular, a mixture of water glass and a 30% aqueous sodium hydroxide solution has very good utility as alkali.

The pH value of the dyeing liquors containing alkali is as a rule 7.5 to 13.2, preferably 8.5 to 11.5.

The dyeing liquors are advantageously prepared by dissolving the dye and by adding the copolymers according to the invention and adding alkali if desired. Depending on the dye used, the dyeing liquors may contain other customary additives, for example electrolytes, for example sodium chloride or sodium sulfate and also sequestering agents, reduction inhibitors, for example sodium nitrobenzenesulfonate and furthermore urea, glycerol and/or sodium formate. If desired, thickening agents, for example alginates, cellulose derivatives, starch ethers or meal ethers such as carob bean meal ethers may also be contained therein.

The impregnation of the cellulose-containing textile material may be carried out by coating, spraying or preferably by padding with the dyeing liquor.

After impregnation, the dyes are fixed by a heat treatment or preferably by the cold pad-batch method.

The thermofixing step can be carried out by steaming, hot batching, thermosoling or by microwave treatment.

In steaming, in order to fix the dyes, the textile materials impregnated with the dyeing liquor are subjected to treatment in a steamer using steam which if desired may be superheated, the said treatment being carried out advantageously at a temperature of 98° to 210° C., advantageously 100° to 180° C. and preferably 102° to 120° C.

In hot batching, the impregnated material is allowed to remain in the moist state for example for 1 to 120 minutes, advantageously at temperatures of 85° to 102° C. In this case the wetted material can be preheated to 85° to 102° C. by infrared treatment. The residence temperature is preferably 95° to 100° C.

The fixation of the dyes by thermosoling may be carried out with or without intermediate drying, for example at a temperature of 100° to 210° C. Thermosoling is preferably carried out at a temperature of 120° to 220° C., preferably 140° to 180° C. and after intermediate drying of the impregnated material at 80° to 120° C. Depending on the temperature, the thermosoling may take from 20 seconds to 5 minutes, preferably from 30 to 60 seconds.

The thermofixing of the dyes can also be carried out by means of microwaves. In this case the material, after impregnation with the dyeing liquor, is treated continuously or discontinuously and inside a chamber using microwaves.

The microwave treatment may take from 5 seconds to 120 minutes. Preferably, 30 seconds to 5 minutes is sufficient. Microwaves are defined as electromagnetic waves (radio waves) in the frequency range from 300 to 100,000 MHz, preferably from 1,000 to 30,000 MHz (mega hertz).

The fixation of the dyes according to the cold pad-batch process is advantageously carried out by storing the impregnated and preferably plaited-down or rolled-up material at room temperature (15° to 30° C.) for example for 3 to 24 hours, in which case it is known that the cold residence time is dye-dependent. If desired, the material may also be stored at a slightly elevated temperature (30° to 80° C.).

After the dyeing process the dyed cellulose material can be rinsed in the customary manner in order to remove unfixed dye. For this purpose, the substrate is treated for example at 40° C. up to the boiling point in a solution containing soap or synthetic washing agent. Treatment with a fixing agent can then be carried out in order to improve the wet fastness properties.

With the process according to the invention level and deep dyeings are obtained, which are distinguished by having an even appearance. Moreover, the end-use fastness properties of the dyed material, for example light fastness, crock fastness and wet fastnesses are not adversely affected by the use of the defined copolymer. In particular, an outstanding penetration of the material on untreated material can be achieved.

The copolymers according to the invention are also suitable for use in dyeing or printing cellulose-containing textile material with reactive dyes or vat dyes assisted by foam, in which processes they contribute significantly to the crispness and moreover these processes can be carried out with the exclusion of the customary thickeners, particularly alginates.

In the following examples, unless stated otherwise, the percentages are by weight. In the case of the dyes, the amounts relate to commercially available, i.e. cut products and in the case of assistants to the pure substance.

PREPARATION EXAMPLES

Example 1

A solution is prepared from 34.12 g of acrylamide, 51.55 g of N-vinyl-N-methylacetamide and 0.09 g of 2,2'-azobis(2-amidinopropane) hydrochloride in 300 g of water and after passing nitrogen above it, the solution is heated to 65° C. in the course of 10 minutes with stirring. After a further 10 minutes the viscosity of the mixture increases rapidly. Polymerization is allowed to occur until the copolymer reaches a viscosity such that it begins to wind itself onto the stirrer. Dilution is carried out with a total of 1042.2 g of water in the course of 45 minutes after which the resin-catalyst mixture is present in greatly swollen form. Thorough stirring is then carried out for 1 hour at 60° C. and the mixture is allowed to cool to room temperature with stirring. Stirring is subsequently carried out for a further 4 hours in order to achieve complete homogenization. 0.01 g of chloroacetamide is added and 1427.9 g of a completely clear, highly viscous material having a polymer content of 6% by weight are obtained.

The product has pseudoplastic characteristics. Dynamic viscosity of a 1.5% solution in mPa.s at 20° C. as a function of the measured shear rate D.

Instrument: Rheomat RM 15/MS 45

| Dynamic viscosity $\eta$ (mPa.s): | | | | | | | | | | |
|---|---|---|---|---|---|---|---|---|---|---|
| 429 | 396 | 357 | 316 | 279 | 233 | 200 | 175 | 152 | 131 | 107 |
| Shear rate D ($s^{-1}$) | | | | | | | | | | |
| 8.35 | 11.1 | 14.3 | 19.0 | 24.9 | 35.3 | 47.1 | 61.5 | 81.1 | 106 | 153 |

Example 2

A solution is prepared from 34.5 g of acrylamide, 44.3 g of N-methyl-N-vinylacetamide and 0.09 g of 2,2'-azobis(2-amidinopropane) hydrochloride in 300 g of water and the said solution is heated to 65° C. in the course of 10 minutes with stirring and while passing nitrogen over it. After a further 20 minutes the viscosity of the solution increases rapidly. Dilution is carried out in the course of 1½ hours by adding 933.8 g of water dropwise; after the addition of water, the mixture is thoroughly stirred for 1 hour at 60° C. and then subsequently stirred for another 12 hours in order to achieve homogenization. 0.01 g of chloroacetamide is added and the mixture is cooled to room temperature with stirring. 1312.6 g of a slightly opaque solution are obtained having a polymer content of 6% by weight.

The product has pseudoplastic characteristics. Dynamic viscosity of a 1.5% solution in mPa.s at 20° C. as a function of the measured shear rate D.

Instrument: Rheomat RM 15/MS 45

| Shear rate D ($s^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | |
| Dynamic viscosity $\eta$ (mPa.s): | | | | | | | | | | |
| 464 | 429 | 387 | 343 | 304 | 256 | 222 | 196 | 170 | 148 | |

Example 3

A solution is prepared from 34.5 g of acrylamide, 46.2 g of N-methyl-N-vinylacetamide and 0.09 g of 2,2'-azobis(2-amidinopropane) hydrochloride in 300 g of water and the said solution is heated to 60° C. in the course of 10 minutes with stirring and while passing nitrogen over it. After a further 25 minutes the viscosity of the solution increases rapidly. Dilution is carried out in the course of 1½ hours by adding 1131.5 g of water dropwise; after the addition of water, the mixture is thoroughly stirred for 1 hour at 60° C. and then subsequently stirred for another 12 hours in order to achieve homogenization. 0.01 g of chloroacetamide is added and the mixture is cooled to room temperature with stirring. 1522.9 g of a slightly opaque solution are obtained having a polymer content of 6% by weight.

The product has pseudoplastic characteristics. Dynamic viscosity of a 1.5% solution in mPa.s at 20° C. as a function of the measured shear rate D.

Instrument: Rheomat RM 15/MS 45

| Shear rate D ($s^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity $\eta$ (mPa.s): | | | | | | | | | | |
| 407 | 380 | 344 | 306 | 273 | 230 | 200 | 176 | 154 | 134 | 111 |

Example 4

A solution is prepared from 34.12 g of acrylamide, 53.45 g of N-methyl-N-vinylacetamide and 0.09 g of 2,2'-azobis(2-amidinopropane) hydrochloride in 300 g of water and the said solution is heated to 60° C. in the course of 10 minutes with stirring and while passing nitrogen over it. After a further 60 minutes the viscosity of the solution increases rapidly. Dilution is carried out in the course of 1½ hours by adding 1071.9 g of water dropwise; after the addition of water, the mixture is thoroughly stirred for 1 hour at 60° C. and then subsequently stirred for another 12 hours in order to achieve homogenization. 0.01 g of chloroacetamide is added and the mixture is cooled to room temperature with stirring. 1459.5 g of a slightly opaque solution are obtained having a polymer content of 6% by weight.

The product has pseudoplastic characteristics. Dynamic viscosity of a 1.5% solution in mPa.s at 20° C. as a function of the measured shear rate D.

Instrument: Rheomat RM 15/MS 45

| Shear rate D ($s^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity $\eta$ (mPa.s): | | | | | | | | | | |
| 196 | 192 | 180 | 169 | 158 | 142 | 129 | 119 | 107 | 96 | 83 |

The following copolymers are prepared in the form of 6% aqueous solutions in a manner identical to that described in Examples 1 to 4. Dynamic viscosity of a 1.5% solution in mP s at 20° C. as a function of the measured shear rate D ($s^{-1}$).

Instrument: Rheomat RM 15/MS 45

Example 5

Copolymer consisting of
49.1% of N,N-dimethylacrylamide
50.9% of N-vinyl-N-methylacetamide

| Shear rate D ($s^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity $\eta$ (mPa.s): | | | | | | | | | | |
| 83.0 | 80.7 | 78.1 | 75.6 | 74.2 | 70.8 | 67.5 | 64.5 | 61.1 | 57.5 | 52.2 |

Example 6

Copolymer consisting of
44.76% of dimethylaminopropyl-methacrylamide
55.24% of N-vinyl-N-methylacetamide

| Shear rate D (s$^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity η (mPa.s): | | | | | | | | | | |
| 276 | 268 | 271 | 266 | 263 | 261 | 255 | 247 | 240 | 227 | 213 |

Example 7

Copolymer consisting of
49.37% of acrylamide
50.63% of vinyl acetate

| Shear rate D (s$^{-1}$) | | | | | | | | |
|---|---|---|---|---|---|---|---|---|
| 14.3 | 19.0 | 24.9 | 35.3 | 47.1 | 61.5 | 81.1 | 106 | 153 |
| Dynamic viscosity η (mPa.s): | | | | | | | | |
| 46.3 | 44.9 | 42.5 | 40.4 | 38.1 | 36.3 | 34.4 | 32.3 | 29.8 |

Example 8

Copolymer made from
32.5% of acrylamide
10% of methacrylamide
57.5% of N-vinyl-N-methylacetamide

| Shear rate D (s$^{-1}$) | | | | | | |
|---|---|---|---|---|---|---|
| 35.3 | 47.1 | 61.5 | 81.1 | 106 | 106 | 153 |
| Dynamic viscosity η (mPa.s): | | | | | | |
| 19.3 | 18.9 | 18.7 | 18.4 | 18.4 | 18.2 | |

Example 9

Copolymer made from
42.5% of acrylamide
6% of diacetone acrylamide
51.5% of N-vinyl-N-methylacetamide

| Shear rate D (s$^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity η (mPa.s): | | | | | | | | | | |
| 305 | 291 | 269 | 244 | 221 | 192 | 169 | 152 | 135 | 119 | 108 |

Example 10

Copolymer made from
37.5% of acrylamide
10% of N-methoxymethylacrylamide
52.5% of N-vinyl-N-methylacetamide

| Shear rate D (s$^{-1}$) | | | | | | | |
|---|---|---|---|---|---|---|---|
| 19.0 | 24.9 | 35.3 | 47.1 | 61.5 | 81.1 | 106 | 153 |
| Dynamic viscosity η (mPa.s): | | | | | | | |
| 33.5 | 33.1 | 32.1 | 30.9 | 30.7 | 30.4 | 29.8 | 29.0 |

Example 11

Copolymer consisting of
47.5% of N-methylacrylamide
52.5% of N-vinyl-N-methylacetamide

| Shear rate D (s$^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity η (mPa.s): | | | | | | | | | | |
| 72.5 | 71.7 | 69.4 | 66.6 | 64.8 | 60.7 | 57.8 | 55.0 | 52.0 | 48.7 | 44.5 |

Example 12

Copolymer made from
37.5% of acrylamide
10% of N,N-dimethylacrylamide
52.5% of N-vinyl-N-methylacetamide

| Shear rate D (s$^{-1}$) | | | | | | | | | |
|---|---|---|---|---|---|---|---|---|---|
| 8.35 | 11.1 | 14.3 | 19.0 | 24.9 | 35.3 | 47.1 | 61.5 | 81.1 | 106 |
| Dynamic viscosity η (mPa.s): | | | | | | | | | |
| 411 | 381 | 345 | 308 | 275 | 233 | 203 | 181 | 159 | 139 |

Example 13

Copolymer made from
27.5% of acrylamide
18% of N-methylacrylamide
54.5% of N-vinyl-N-methylacetamide

| Shear rate D (s$^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity η (mPa.s): | | | | | | | | | | |
| 181 | 178 | 168 | 155 | 145 | 130 | 117 | 107 | 96.4 | 86.3 | 74.8 |

Example 14

Copolymer made from
15% of methacrylamide
27.5% of diacetone acrylamide
57.5% of N-vinyl-N-methylacetamide

| Shear rate D (s$^{-1}$) | | | | | | | | | | |
|---|---|---|---|---|---|---|---|---|---|---|
| 8.35 | 11.1 | 14.3 | 19.0 | 24.9 | 35.3 | 47.1 | 61.5 | 81.1 | 106 | 153 |
| Dynamic viscosity η (mPa.s): | | | | | | | | | | |
| 73.5 | 75.0 | 71.9 | 68.5 | 65.5 | 61.7 | 58.3 | 55.0 | 51.7 | 48.0 | 43.5 |

APPLICATION EXAMPLES

Example 15

A brown-state knitted cotton fabric (165 g/m$^2$) is impregnated on a pad-mangle with an aqueous liquor, which contains, per liter, 50 g of the dye of the formula

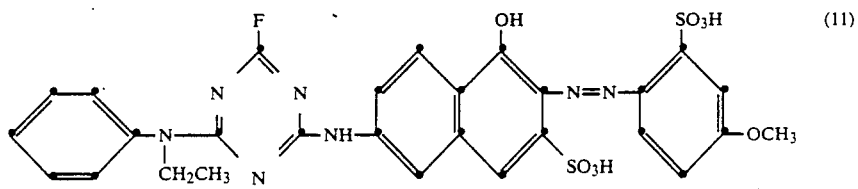

(11)

3.0 g of a wetting agent consisting of sodium pentadecane-1-sulfonate and the addition product from 4 mol of ethylene oxide onto 1 mol of a $C_9$–$C_{11}$ primary alcohol in the ratio of 3:1 by weight,
 10 ml of the copolymer prepared according to Example 1,
 10 ml of sodium hydroxide solution (30%) and
 75 ml of soda water glass solution having a silicate content of 26.3–27.7%,
whereupon after padding a liquor pick-up of 198% (calculated on the dry weight of the substrate) is obtained. The impregnated knitted fabric is rolled up and stored for 5 hours at room temperature. After this, the knitted fabric is rinsed and subsequently washed for 20 minutes at the boiling point with a non-ionic washing agent (0.5 g/l of the addition product from 9 mol of ethylene oxide onto 1 mol of nonyl phenol) in a liquor ratio of 40:1. The substrate is then rinsed again and dried.

A strong and brilliant red dyeing is obtained, which is particularly distinguished by having an even appearance.

Similarly good results are obtained, when instead of the copolymer according to Example 1, the identical amount in each case of a copolymer prepared according to Examples 2 to 14 is used.

Example 16

A brown-state knitted cotton fabric with a weight per unit surface area of 165 g/m² is impregnated on a pad-mangle at 25° C. with a liquor which contains, per liter,
 50 g of the dye of formula (11)
 2.5 g of a wetting agent consisting of sodium pentadecane-1-sulfonate and the addition product from 4 mol of ethylene oxide onto 1 mol of a $C_9$–$C_{11}$ primary alcohol in the ratio by weight of 3:1,
 4 ml of a copolymer prepared according to Example 1,
 10 ml of sodium hydroxide solution (30%) and
 75 ml of soda water glass solution with a silicate content of 26.3–27.7%,
whereupon a liquor pick-up of 130% (calculated on the dry weight of the substrate) is achieved using a dipping time of 0.86 seconds and a roll pressure of 1.5 bar/cm². After this, the knitted fabric is rolled up, wrapped in a plastic film and treated for 3 minutes with microwaves at a frequency of 2450 MHz. Then the knitted fabric is rinsed and subsequently washed for 20 minutes at the boiling point with a non-ionic washing agent (0.5 g/l of the addition product from 9 mol of ethylene oxide onto 1 mol of nonyl phenol) in a liquor ratio of 40:1. The substrate is then rinsed again and dried.

A strong and brilliant red dyeing having good levelness is obtained.

Example 17

A printing dye is prepared, which contains the following additives in 1 liter of water:
 50 g of a dye of the formula

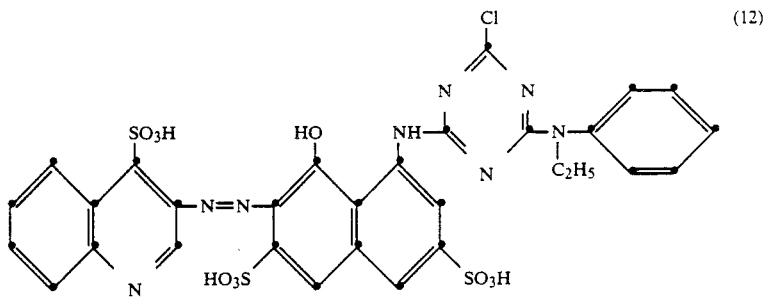

(12)

100 g of an aqueous mixture, which contains 7.5 g of an addition product from 2 mol of ethylene oxide onto 1 mol of cetyl alcohol, and 0.025 g of sodium lauryl sulfate,
 4 g of the copolymer prepared according to Example 1,
 10 g of sodium m-nitrobenzenesulfonate,
 60 g of a 25% aqueous sodium carbonate solution and
 100 g of urea.

After this the printing dye is foamed in a closed system via foaming equipment. The degree of foaming is 192 g/l. The foam half life period is 20 hours. This foam is compressed through pipes via a screen onto a cotton woven fabric with a pressure of 0.40 bar. Thereupon, the printed woven fabric is steamed for 8 minutes at 102° C. and then soaped as usual and dried.

A strong, level and crisp red print is obtained having an excellent handle and good end-use fastness properties.

What is claimed is:

1. A process for dyeing textile materials which consist wholly or partially of cellulose fibers, with direct dyes or reactive dyes, which process comprises impregnating the cellulose materials with an aqueous dyeing liquor which in addition to the dye contains a copolymer, which is obtained from a monomer mixture consisting of
 (1) 20 to 50% by weight of an N-unsubstituted acrylamide or methacrylamide or acrylamide or methacrylamide which is N-substituted by $C_1$–$C_5$-alkyl, $C_2$–$C_4$-hydroxyalkyl, $C_2$–$C_4$alkoxyalkyl, di- ($C_1$–$C_4$-alkylamino)-$C_1$–$C_5$-alkyl, acetyl, acetyl-$C_1$–$C_5$-alkyl, —$CH_2CONH_2$ or $$-CH-CONH_2$$
$$\quad |$$
$$\quad OCH_3$$

and (2) 50 to 80% by weight of an N-vinyl-substituted amide of a saturated $C_1$–$C_4$ aliphatic monocarboxylic acid, or, a vinyl ester of a saturated $C_1$–$C_4$ aliphatic monocarboxylic acid, the sum of (1) and (2) adding up to 100%, and then fixing the dyes by a heat treatment or by the cold pad-batch method.

2. A process according to claim 1, wherein the dyeing liquor additionally contains an alkali resistant wetting agent.

3. A process according to claim 1, wherein the dyeing liquor contains the copolymer in an amount from 2 to 40 g per liter in the form of 3 to 10% aqueous solutions.

4. A process according to claim 1, wherein reactive dyes are used.

5. A process according to claim 1, wherein the heat treatment is carried out using microwaves.

6. A process according to claim 1, wherein the heat treatment is carried out by thermosoling.

7. A process according to claim 1, wherein the heat treatment is carried out by steaming.

8. A process according to claim 1, wherein the dye fixation is carried out by the cold pad-batch method.

9. A process of claim 1 wherein the monomer (2) is selected from the group consisting of N-vinylformamide, N-methyl-N-vinylformamide, N-vinylacetamide, N-methyl-N-vinylacetamide and N-ethyl-N-vinylacetamide.

10. A process according to claim 1, wherein the monomer (1) is acrylamide or methacrylamide.

11. A process according to claim 9, wherein the monomer (2) is N-vinylacetamide, N-methyl-N-vinylacetamide or N-ethyl-N-vinylacetamide.

12. A process according to claim 1, wherein the monomer mixture consists of 25 to 48% by weight of the acrylamide compound (1) and 52 to 75% by weight of the vinyl compound (2).

13. A process according to claim 1, wherein the monomer mixture consists of 35 to 48% by weight of acrylamide and 52 to 65% by weight of N-methyl-N-vinylacetamide, the sum of the reacted components being 100%.

* * * * *